(12) United States Patent
Foss et al.

(10) Patent No.: US 8,844,458 B2
(45) Date of Patent: Sep. 30, 2014

(54) CONCEALABLE WORKSTATION FOR BOATS

(75) Inventors: Charles Dean Foss, New Smyrna Beach, FL (US); Paul Sherwood-Berndt, Titusville, FL (US)

(73) Assignee: Boston Whaler, Inc., Edgewater, FL (US)

( * ) Notice: Subject to any disclaimer, the term of this patent is extended or adjusted under 35 U.S.C. 154(b) by 219 days.

(21) Appl. No.: 13/367,619

(22) Filed: Feb. 7, 2012

(65) Prior Publication Data

US 2013/0200765 A1    Aug. 8, 2013

(51) Int. Cl.
*B63B 29/04*    (2006.01)
*A47B 88/00*    (2006.01)

(52) U.S. Cl.
USPC ............................... 114/188; 312/302

(58) Field of Classification Search
USPC ............ 114/188, 189, 363; 312/139.1, 229, 312/291–292, 302–303, 310–311, 322–323, 312/330.1
See application file for complete search history.

(56) References Cited

U.S. PATENT DOCUMENTS

| 29,493 | A | * | 8/1860 | Iske | 312/228 |
|---|---|---|---|---|---|
| 176,889 | A | * | 5/1876 | Phillips | 312/303 |
| 1,308,652 | A | * | 7/1919 | Arnold | 312/273 |
| 1,870,553 | A | * | 8/1932 | Bullen | 312/233 |
| 2,867,471 | A | | 1/1959 | Coon | |
| 3,692,351 | A | | 9/1972 | Christopher | |
| 4,010,989 | A | * | 3/1977 | Klug | 312/204 |
| 4,854,261 | A | | 8/1989 | Goldsmith | |
| 4,883,317 | A | | 11/1989 | Davenport | |
| 4,969,678 | A | | 11/1990 | Loisel | |
| 4,970,982 | A | | 11/1990 | Martin | |
| 4,989,535 | A | | 2/1991 | Lacasse et al. | |
| 5,209,178 | A | | 5/1993 | Rowe | |
| 5,595,429 | A | | 1/1997 | Kennedy | |
| 5,606,905 | A | * | 3/1997 | Boehm et al. | 99/375 |
| 5,622,404 | A | | 4/1997 | Menne | |
| 5,692,335 | A | | 12/1997 | Magnuson | |
| 5,723,850 | A | | 3/1998 | Lambert | |
| 6,263,825 | B1 | | 7/2001 | Davidson | |
| 7,128,369 | B2 | | 10/2006 | Boggs et al. | |
| D610,959 | S | * | 3/2010 | Gros | D12/300 |
| 8,276,523 | B2 | * | 10/2012 | Miller et al. | 108/50.02 |
| 2004/0035347 | A1 | | 2/2004 | Grober | |
| 2006/0137379 | A1 | | 6/2006 | Cawthon | |
| 2008/0308087 | A1 | | 12/2008 | Rosenzweig | |
| 2010/0264793 | A1 | * | 10/2010 | Gutnik | 312/319.1 |
| 2013/0200765 | A1 | * | 8/2013 | Foss et al. | 312/237 |

* cited by examiner

*Primary Examiner* — Lars A Olson
*Assistant Examiner* — Andrew Polay
(74) *Attorney, Agent, or Firm* — Malin Haley DiMaggio & Bowen, P.A.

(57) ABSTRACT

A storage assembly comprising a slideable upper drawer unit and a lower drawer unit disposed in a housing. The upper drawer unit includes a slideable workstation and one or more primary drawers disposed beneath the workstation. A work panel is hingeably attached to a top surface of the workstation whereby the work panel is operable between an open position and a closed position. In the closed position, the work panel covers and conceals at least a portion of the top surface of the workstation, and in the open position the work panel is perpendicular to the top surface of the workstation. The work panel is received in a rear slot of the workstation when it is in the open position. The workstation may include features such as a sink and a cook top. The housing may be received in a seat casing, console, or bench on the boat.

9 Claims, 10 Drawing Sheets

CONCEALABLE WORKSTATION FOR BOATS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention generally relates to storage compartments and workstations and more particularly to a concealable workstation for use on sea-faring vessels such as pleasurecraft and boats.

2. Description of Related Art

As is well appreciated in the art of marine vessels and particularly pleasurecraft and sport boats, on-board storage and usable working space is an absolute necessity. However, because of the relatively small confines of a boat cabin or cockpit in conjunction with the unpredictable ride and handling characteristics of a boat, designing useful storage compartments and workspaces is challenging. While certain known designs are suitable for certain purposes, many have compromises whereby the use of one feature necessarily detracts from the other; for example, deploying a cooktop may render a drawer unusable. Consequently, there have been numerous attempts to develop more efficient and usable storage compartments and workspaces for vessels.

For example, U.S. Pat. No. 6,263,825 to Davidson discloses a boat having a sink and food preparation station concealed by a cushioned deck. Compartments on either side of the engine area of the vessel allow for storage of an ice chest, food, clothing or other items and are accessible from the rear cabin area when hinged portions of the cushioned deck are raised. The side of the rear cabin behind the captain seat accommodates a portable toilet which is concealed underneath the captain seat. Accordingly, while providing concealed and useful storage, the cushioned seat area is rendered useless when the storage and food station are needed.

U.S. Pat. No. 4,854,261 to Goldsmith discloses a combination seat for boats having a housing with an upper section and a lower section, a seating assembly mounted on the upper section and a galley assembly mounted in the lower section. The seating assembly moves between an erected position where it defines a pair of back-to-back seats and a collapsed position wherein it defines a flat sleeping platform. The upper housing section and seating assembly are upwardly hingeable to provide access to the galley assembly. Thus, in order to access the galley assembly, the seat assembly is rendered useless.

U.S. Pat. No. 5,692,335 to Magnuson describes a combined seat and tackle container for ice fishing having a seating portion, a rear storage compartment integrate with the back rest of the seat, and a hinged seat bottom which covers an upper storage compartment in which small items may be stored. A lower storage compartment is also provided beneath the seat.

U.S. Pat. No. 5,622,404 to Menne describes a combined seating and storage system for pontoon boats having a lid connected to a storage container by a double pivot hinge which enables the lid to open to a vertical position in front of the storage container.

U.S. Pat. No. 4,989,525 to Lacasse et al. describes a combination steering console and refreshment center for a pontoon boat. The console includes a first face on which with the steering wheel is mounted and a second, opposing face. The upper portion of the second face includes an opening with a hinged cover which moves from a closed position to a horizontal open position, which exposes a service counter. The storage counter may include one or more wells which may be used for sinks, cook tops, or the like. A lower storage compartment is provided below the storage counter.

Accordingly, there is a need in the art for a more efficient concealable storage and workspace system that maximizes the usable space without interfering with other structures or having one feature thereof detract from another. It is, therefore, to the effective resolution of the aforementioned problems and shortcomings of the prior art that the present invention is directed. However, in view of the storage systems in existence at the time of the present invention, it was not obvious to those persons of ordinary skill in the pertinent art as to how the identified needs could be fulfilled in an advantageous manner.

SUMMARY OF THE INVENTION

The present invention provides a storage assembly including a concealable workstation. In some embodiments, the storage assembly comprises a slideable upper drawer unit and a lower drawer unit disposed in a housing. The upper drawer unit includes a slideable workstation and one or more primary drawers disposed beneath the workstation. The workstation includes a work panel hingeably attached to a top surface of the workstation whereby the work panel is operable between an open position and a closed position wherein, in a closed position the work panel is configured to cover and conceal at least a portion of the top surface of the workstation, and in the open position the work panel is substantially perpendicular to the top surface of the workstation. In some embodiments, the work panel is omitted and the top surface of the workstation is exposed.

In some embodiments, the lower drawer unit comprises one or more secondary drawers. The workstation may include one or more entertainment or utility features such as a storage compartment, basin, sink, cook top, cup holders, and the like. For additional functionality, the work panel is configured to be received in a rear slot of the workstation when it is hinged upward in the open position. In some embodiments, in the open position the work panel partially extends above the top surface of the workstation in perpendicular fashion and defines a backsplash for the workstation. The housing of the storage assembly may be received in a variety of structures on a boat, such as a seat casing. Further, the seat casing or other structures may comprise the housing itself.

Accordingly, it is an object of the present invention to provide a more efficient, better-designed storage assembly for a boat including a concealable and functional workstation.

It is another object of the present invention to provide a storage assembly including a concealable workstation that allows the use of one or more features without interfering with the use of one or more other features.

It is another object of the present invention to provide a storage assembly including a concealable workstation that provides a cook top, grill, storage compartment, sink, fishing preparation features and other useful and entertaining features while also providing useable storage space.

It is another object of the present invention to provide a storage assembly include a concealable workstation that can be installed in any desired structure on a boat, including behind a seat, bench, console, bulkhead or the like.

In accordance with these and other objects which will become apparent hereinafter, the instant invention will now be described with particular reference to the accompanying drawings.

DETAILED DESCRIPTION

Figure 1:
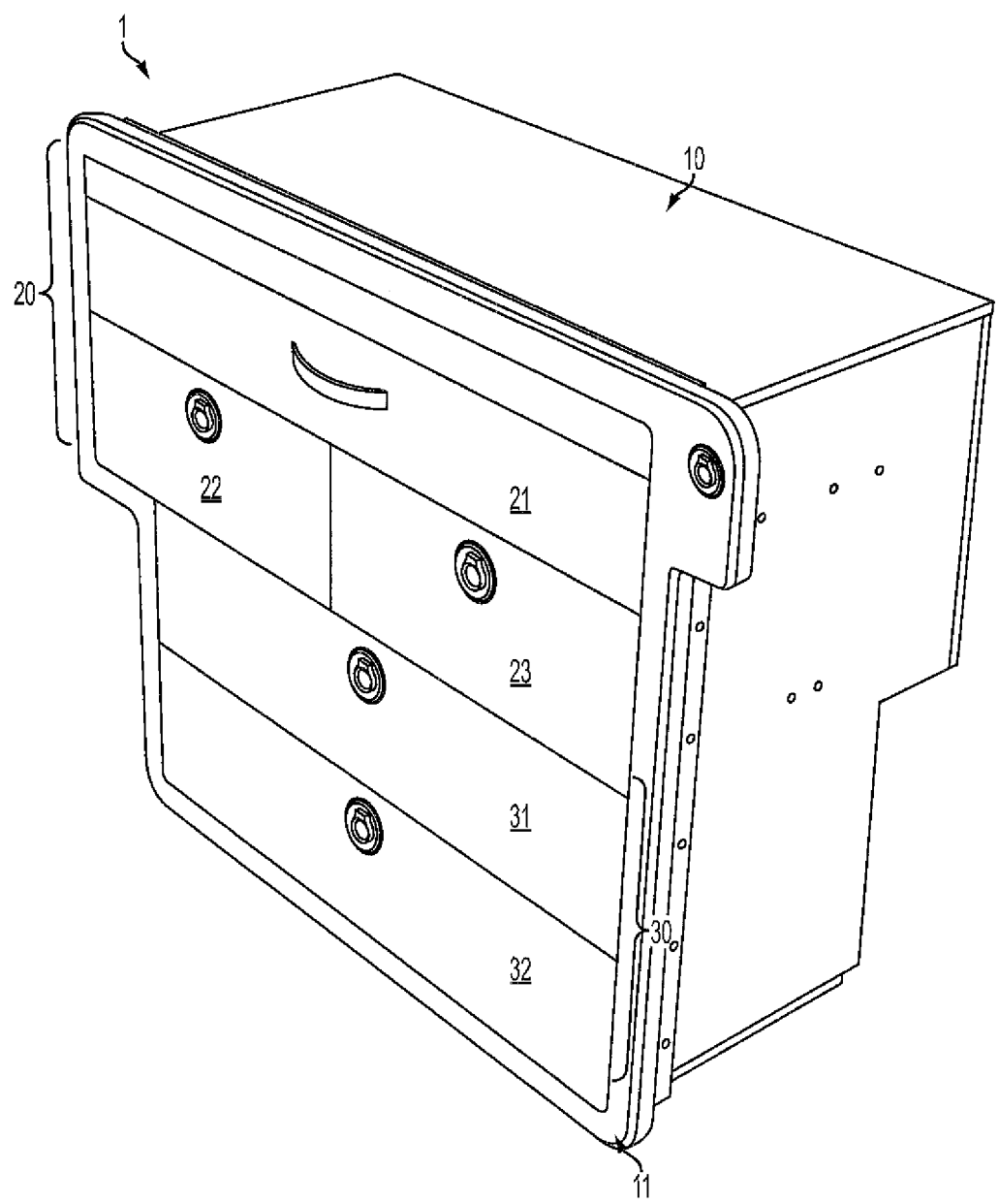
FIG. 1 is a front perspective view of one embodiment of the present invention in a closed position.

FIG. 1 is a front perspective view of one embodiment of the present invention. Shown is storage assembly 1 in isolation from surrounding structure, however it is understood that in certain embodiments the storage assembly 1 is disposed within a cavity such as behind a seat, console, or other structure on a boat. In some embodiments, storage assembly 1 comprises a housing 10, an upper drawer unit 20, and a lower drawer unit 30. In some embodiments, the upper drawer unit 20 comprises a concealable workstation 21 and one or more primary drawers 22 and 23. As shown, the primary drawers 22 and 23 are arranged in a side-by-side configuration and are disposed below workstation 21. Lower drawer unit 30 is disposed beneath upper drawer unit 20 and comprises one or more secondary drawers. In some embodiments, two secondary drawers 31 and 32 are provided in a stacked configuration; however, it is appreciated that lower drawer unit 30 may comprise any number of secondary drawers as desired, in any size and configuration so desired. As shown, in some cases the upper drawer unit 20 is relatively wider and deeper than lower drawer unit 30, but this need not necessarily be the case, as the dimensions can vary depending on design preferences and the intended installation. Storage assembly 1 may further comprise a faceplate 11 disposed around the upper drawer unit 20 and lower drawer unit 30.

Figure 2:
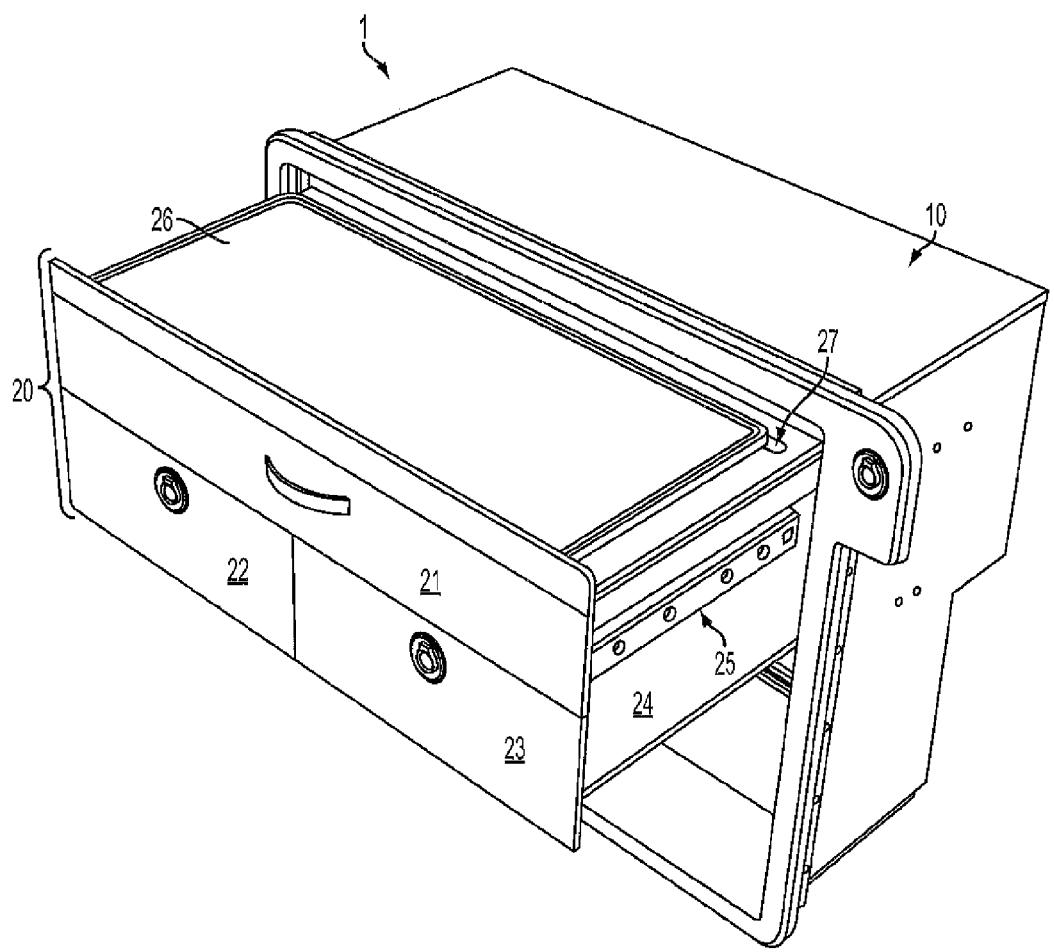
FIG. 2 is a perspective view of one embodiment of the present invention, shown with upper drawer unit in an open, extended position.

FIG. 2 is another perspective view of one embodiment of the present invention, shown with upper drawer unit 20 in an open, extended position. In some embodiments, upper drawer unit 20 comprises a drawer casement 24 which is configured as an open-topped box having two side panels and a bottom panel. A sliding track 25 is provided on either side of the drawer casement 24 and is designed to engage a complementary track provided on the inside of housing 10. The sliding track 25 allows upper drawer unit 20 to slide in and out of housing 10 and also provides stability and support for upper drawer unit 20, particularly when it is fully extended out of housing 10. Other sliding mechanism may be equally suitable as sliding track 25 provided they allow upper drawer unit 20 to fully extend and provide enough support and stability. Mechanical, pneumatic, hydraulic or electro-mechanical sliding mechanisms are contemplated. Also shown is work panel 26 which may be configured as a cutting board or general work surface and is disposed at the top of workstation 21. In a closed position, work panel 26 is configured to cover and conceal other components disposed within workstation 21 as discussed in further detail below. In some cases, the work panel 26 may be omitted, and the workstation 21 may simply provide the components and features described below.

Figure 3:
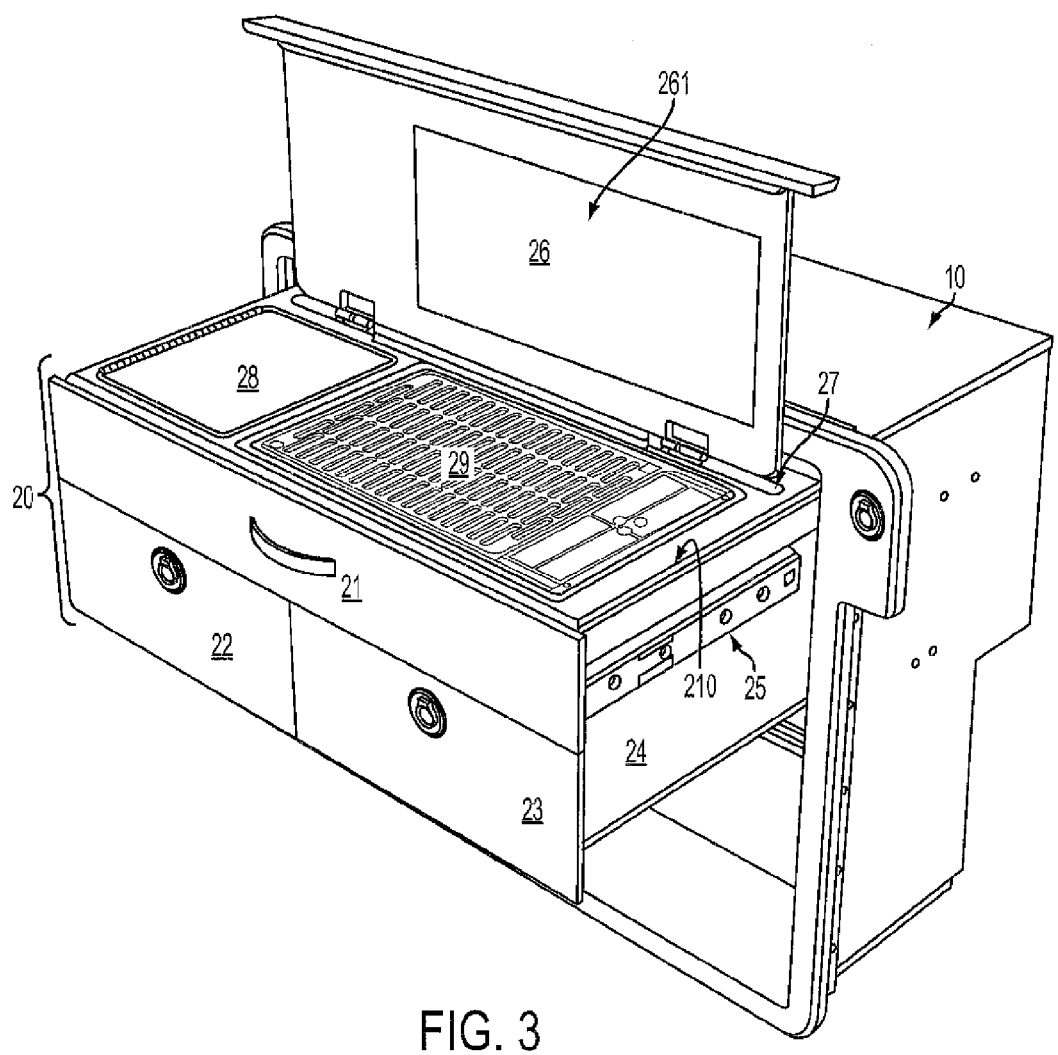
FIG. 3 is a perspective view of the present invention with the work panel pivoted upward about the workstation.

FIG. 3 shows another perspective view of the present invention. As shown, work panel 26 is hingeably mounted to workstation 21 such that it pivots upward and rearward to reveal one or more entertainment or utility features disposed within workstation 21, including but not limited to sinks, cooking surfaces, storage compartments, electrical outlets, lighting, cup holders, fishing preparation devices and features, and the like. In FIG. 3, workstation 21 includes a covered storage compartment or basin 28 and cook top 29. Also shown is top surface 210 of workstation 21, which defines the surface wherein the basin 28 and cook top 29 are disposed, and may define a larger surface area in the case where the basin 28, cook top 29, or other feature is omitted from workstation 21. In the open position, work panel 26 is substantially perpendicular to the top surface 210 of workstation.

Figure 4:
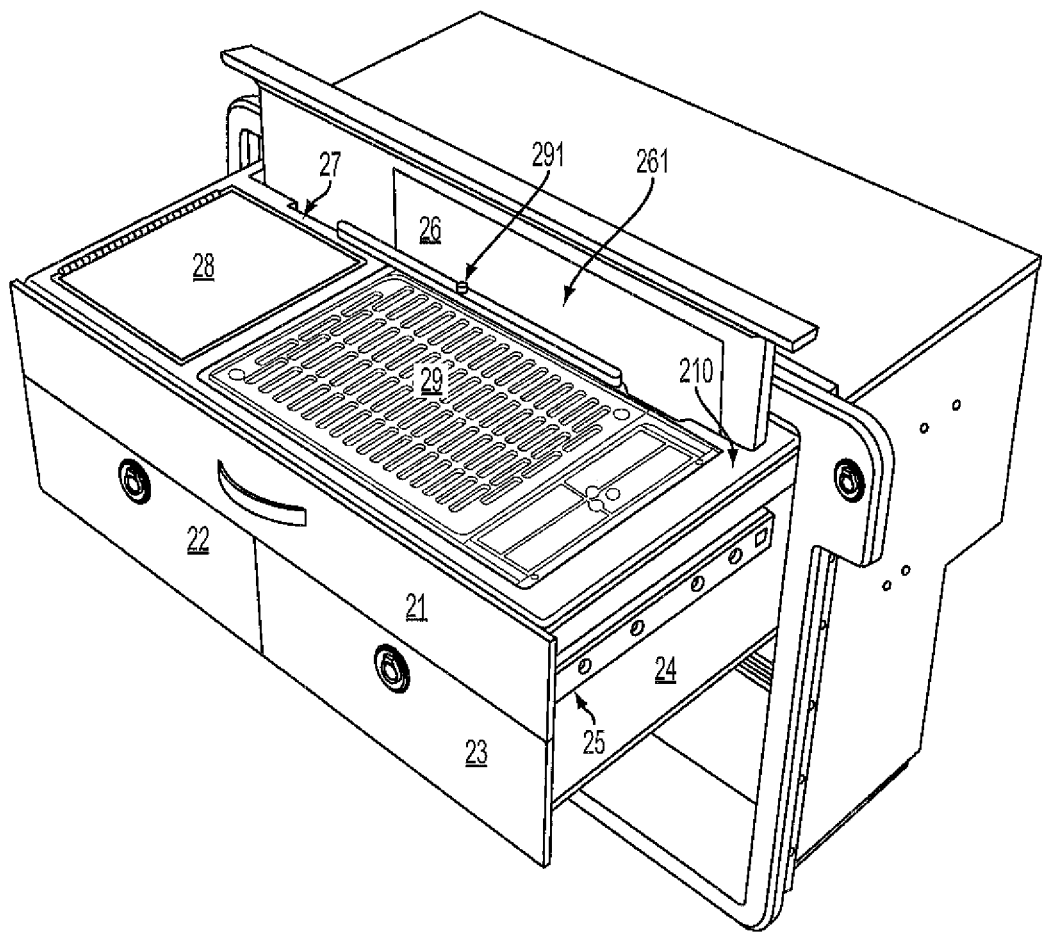
FIG. 4 is a perspective view of the present invention with the work panel fully disposed within a rear slot.

Shown throughout the figures and in particular in FIG. 4 is rear slot 27 which is configured to receive work panel 26. Accordingly, when work panel 26 is hinged upward and backward about workstation 21, it reaches a position where it is substantially vertically aligned with slot 27 and substantially perpendicular to top surface 210 or workstation 21. Work panel 26 is configured to be received in rear slot 27 in vertical fashion, and may ride along a track or other sliding means which provides assistance and stability to the sliding action. Additionally, an assistive device such as springs or other similar mechanisms may be employed in order to assisting in the lifting, pivoting, and retraction of work panel 26 during use. In some embodiments work surface extends down into rear slot 27 only partially such that a portion of work panel 26 remains above top surface 210 of workstation 21 in order to function as a backsplash for the features of workstation 21. Accordingly, work panel 26 extends downward into casement 24 inside rear slot 27. The pivoting/sliding action of work panel 26 is particularly useful because it allows the work panel 26 to serve a plurality of functions including concealing and protecting the other features of workstation 21 such as basin 28 and cook top 29, providing a working surface such as a cutting board for preparing food, and providing a backsplash to catch oil and other debris that may be ejected from cook top 29 or other features of workstation 1.

Further, in some embodiments, at least a portion of, if not the entire work panel 26 includes a heat shield 261 or is coated with a heat shielding material so that the work panel 26 can withstand the heat emanating from cook top 29 or other heat generating feature provided on workstation 21 (see FIGS. 3 & 4). The heat shield functionality also allows the workstation 21 to be closed before the cook top 29 or other feature has completely cooled down. Further still, in some embodiments, cook top 29, which may be configured as a grill, includes a safety shut-off switch 291 which may disposed toward the rear of cook top 29 such that when work panel 26 is returned to the closed position, the work panel 26 pressues down on the safety switch 291, which immediately cuts off power to the cook top 29. For example, safety switch 291 could cut off electricity or the flow of fuel to the cook top. This is a secondary safety feature that, in conjunction with heat shield 261, limits potential danger associated with a hot cook top 29.

Figure 5:
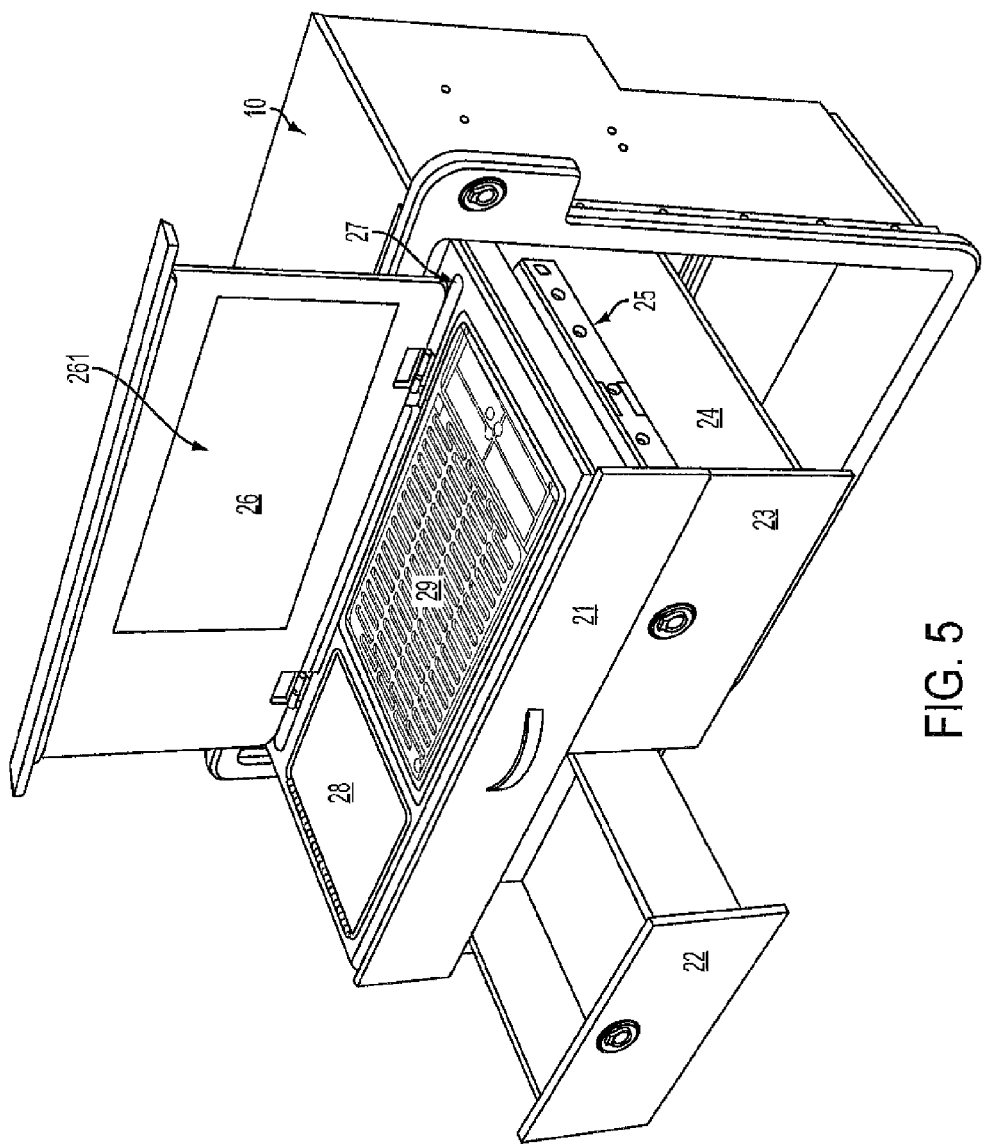
FIG. 5 is a perspective view of the present invention showing a primary drawer in an extended position.

FIG. 5 depicts another aspect of the present invention. As shown, primary drawers 22 and 23 are configured to be slideable within drawer casement 24, which casement 24 is slideable within housing 10. Accordingly, primary drawers 22 and 23 are openable regardless of whether the entire upper drawer unit 20 is extended from housing 10. In the case that upper drawer unit 20 is extended from housing 10, primary drawers 22 and 23 are also accessible. A space may be delineated below upper drawer unit 20 which may provide room for a cooler or other external item. Again, the present invention may incorporate one or more primary drawers in any desired size and configuration; the depiction of two side-by-side primary drawers 22 and 23 is merely an exemplary embodiment.

Figure 6:
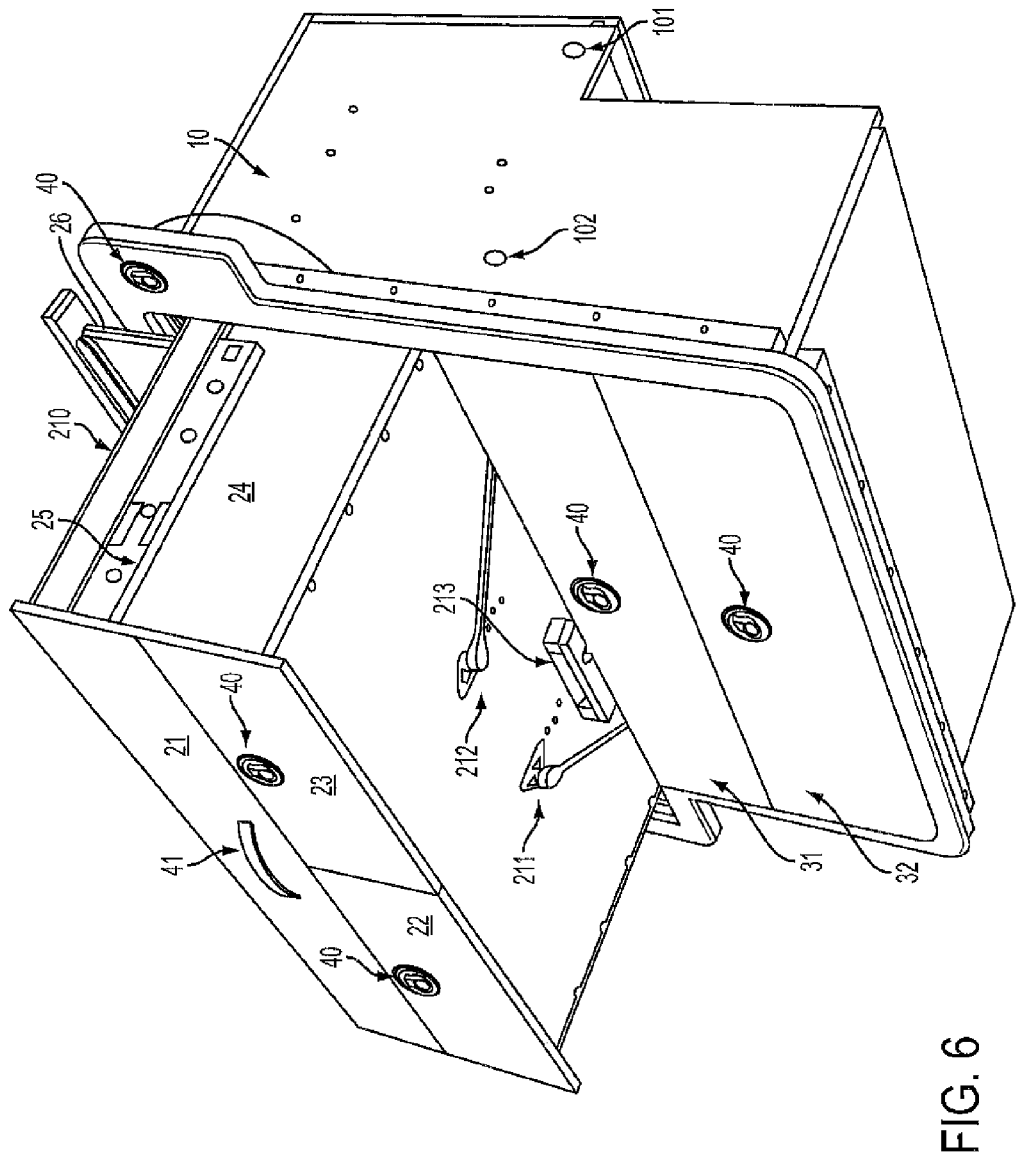
FIG. 6 is a perspective view of the underneath of the present invention.

FIG. 6 is a perspective view of the underneath of storage assembly 10. Shown is upper drawer unit 20 in a partially extended position. In some embodiments, due to the weight of the components and features of upper drawer unit 21, additional support may be required and therefore one or more stabilizers 211 and 212 may be provided as supporting drawer casement 24. These stabilizers may comprise hydraulic rams or spring loaded devices that assist in and/or control the opening of upper drawer unit 10 as well as provide additional lateral and vertical support. In some cases, the stabilizers 211 and 212 project at an angle from the sides of easement 24 toward the center of the bottom panel of casement 24. The stabilizers 211 and 212 may also be capable of locking such that upper drawer unit 20 can be locked in its deployed/extended position. To that extent, workstation 21, primary drawers 22 and 23 as secondary drawers 31 and 32 may also be lockable in their extended positions by way of stops provided in the sliding mechanisms of each component. Furthermore, actuation of upper drawer unit 20 may be accomplished with an electro-mechanical device or hydraulic or pneumatic means and, depending on the configuration, stabilizers 211 and 212 may not be necessary due to the overall loading strength of such alternative actuation means.

Figure 7:
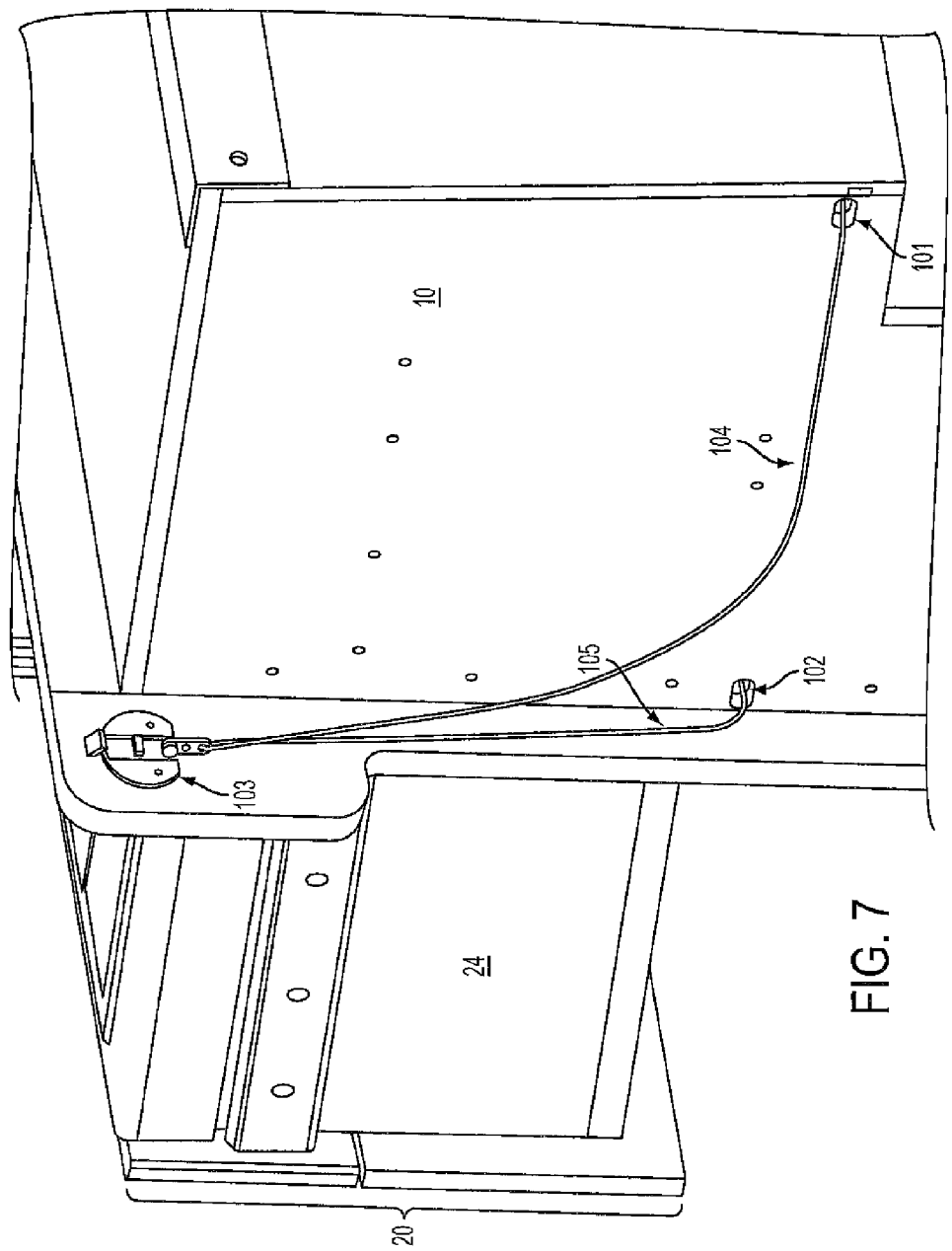
FIG. 7 is a rear perspective view of one embodiment of the present invention.
Figure 8:
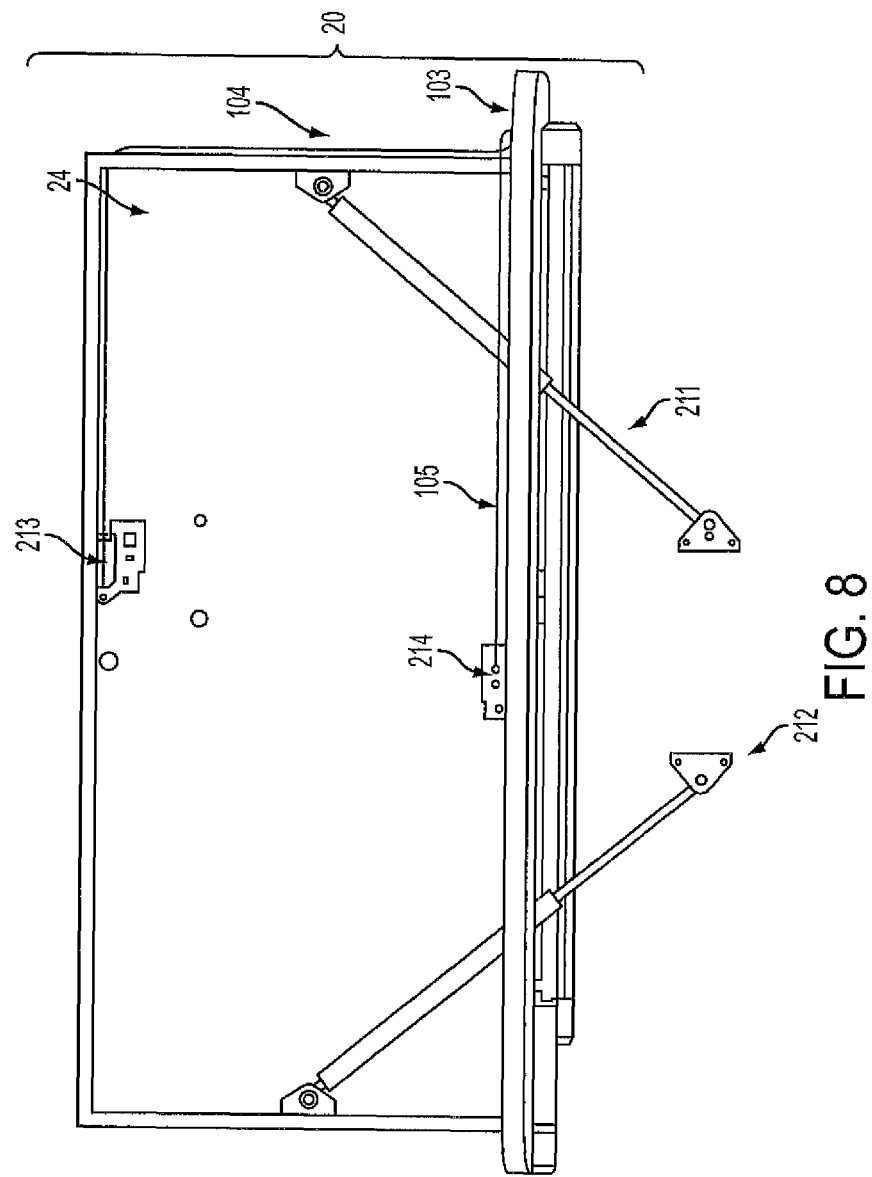
FIG. 8 is a bottom view of the upper drawer unit of the present invention.

With reference to FIGS. 6-8, some embodiments of the present invention may incorporate a cable retaining system configured to retain and stabilize upper drawer unit 20 within housing 10. The retaining system is particularly useful whereby stabilizers 211 and 212 control opening and closing and the retaining system locks the upper drawer unit 20 in those open and closed positions. Accordingly, one side of housing 10 may include one or more holes 101 and 102. The upper rear side of faceplate 11 includes a switch 103 which is connected to one or more cables, in this case, cables 104 and 105. Cables 104 and 105 pass through holes 101 and 102, respectively, and attach at the other end to remote catches 213 and 214 (FIG. 8). Switch 103 is operable between at least a locked position and unlocked position whereby moving it to the locked position pulls on cables 104 and 105 which thereby activates at least one of the remote catches 213 and/or 214. In some embodiments, the catches include tangs or other projections which extend from catches 213 and 214 below the surface of easement 24 and thereby prevent upper drawer unit 20 from moving. With the switch 103 moved to the unlocked position, the catches are released, and upper drawer unit 20 is free to open and close along its tracks 25. It is appreciated that the locking action can be accomplished when upper drawer unit 20 is either opened or closed. For example, if the upper drawer unit 20 is opened, catch 213 would be disposed between the rear of the drawer and other structure, such as secondary drawer 31, thus locking the drawer unit 20 in place (See FIG. 6). If upper drawer unit 20 is closed, catch 214 could be activated and would provide a tang or projection blocking the front of the drawer unit 20. Accordingly, the cable retaining system is particularly useful when the vessel is in operation in that it prevents the upper drawer unit 20 from unexpectedly opening or closing. In some embodiments, the front side of switch 103 is configured as a latch 40 such that its appearance matches the other latches 40 should they be provided.

It is appreciated upon inspection of the figures that the lower drawer unit 30 comprising secondary drawers 31 and 32 provide additional storage disposed beneath upper drawer unit 20. Accordingly, secondary drawers 31 and 32 may be slidingly engaged with housing 10 such that they can extend and retract as a typical drawer would. A sliding mechanism may be utilized for each such secondary drawer, including a track system as previously discussed with respect to other of the elements herein. Other sliding engagements and mechanisms may also be used. Further still, locking mechanisms may be implemented for each of the secondary drawer 31 and 32 as well as for primary drawers 22 and 23 and workstation 21 which mechanisms prevent the unintended extension or sliding of the components. The locking mechanism may be incorporated into latches 40 (see FIG. 6) which are disposed on the front panels of each of the workstation 21, primary drawers 22 and 23, and secondary drawers 31 and 32. The latches 40 provide a grab point for the user to extend and retract the drawers as desired. In other embodiments, the locking mechanisms may be separate from latches 40, for example clips, buttons, straps, and the like may be incorporated as locking/retaining mechanisms. Latches 40 could also be configured as handles, such as handle 41 (FIG. 1). Latches 40 and handles 41 can be utilized as desired on any or all of the drawers, in any desired combination.

Figure 9:
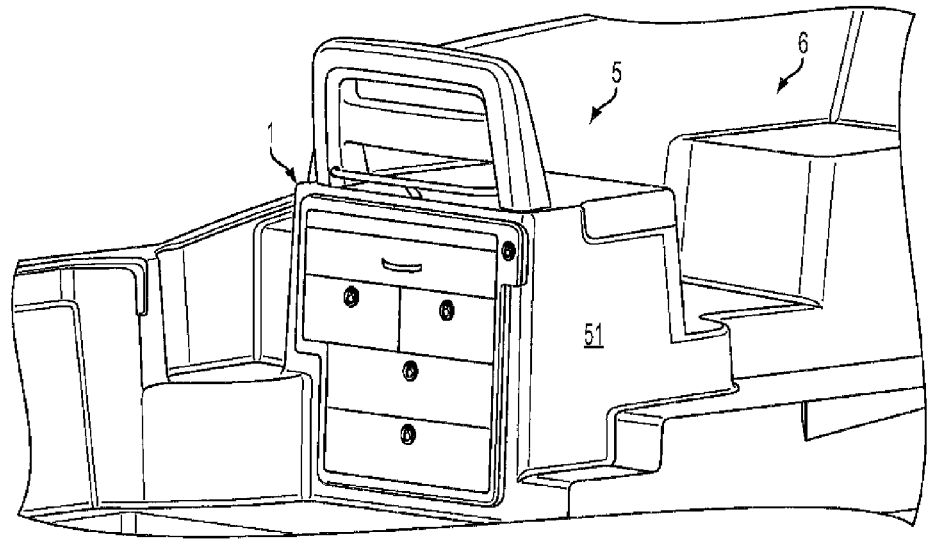
FIGS. 9-11 are perspective views of an exemplary installation of the present invention in a boat.
Figure 10:
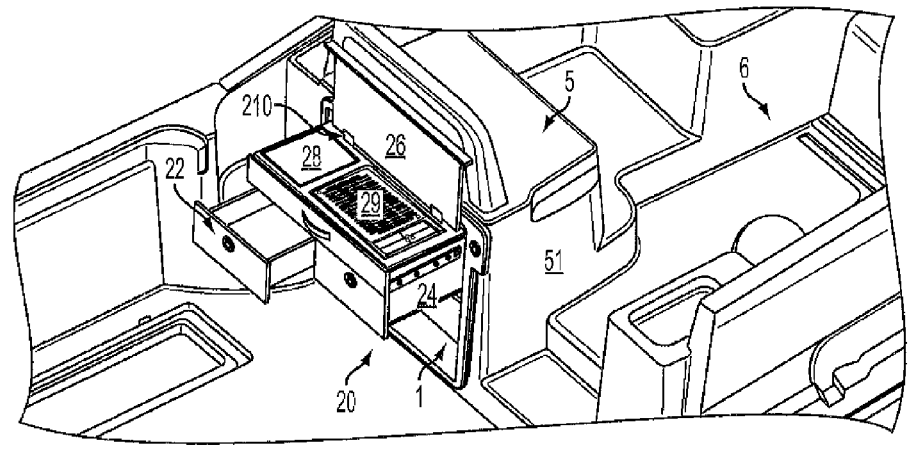
Figure 11:
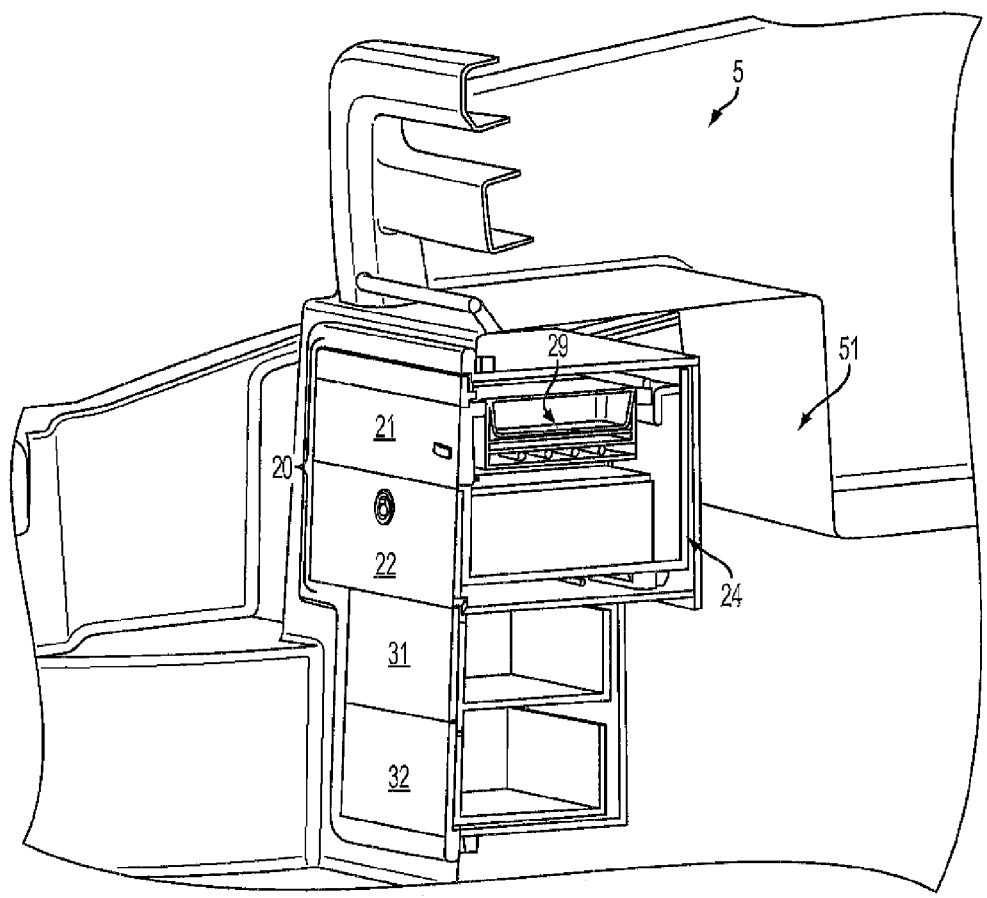

FIGS. 9-11 depict the storage assembly 1 disposed behind a seat 5 located in the cockpit 6 of an exemplary boat. As shown, storage assembly 1 is disposed within the support structure of seat 5, in this case defined as a fiberglass seat casing 51. In some embodiments, storage assembly 1 is mounted such that housing 10 is fully disposed behind and underneath the seat, with the front panels of each of the workstation 21, primary drawers 22 and 23, and secondary drawers 31 and 32 facing the rear of the vessel. Faceplate 11 is mounted against seat casing 51 such that the storage assembly 1 appears integrated with seat casing 51. FIG. 8 demonstrates the storage assembly 1 as disposed within the seat casing with upper drawer unit 20 extended, secondary drawer 22 extended, and work panel 26 hinged upward, revealing top surface 210, basin 28, and cook top 29.

FIG. 9 is a cross-sectional view of storage assembly 1 showing the relative dimensions of the constituent components. As shown, primary drawer 22 is dimensioned such that it is not as deep as casement 24 in order to allow room for work panel 26 to be received down into rear slot 27. Accordingly, with work panel 26 in a fully open position, a portion of it will be disposed within casement 24, behind primary drawers 22 and 23 and workstation 21.

It is appreciated and understood that the storage assembly 1 of the present invention can be dimensioned to be disposed in any structure on a vessel as desired, and need not necessarily be placed behind a seat. The relative dimensions, shape, and configuration of the workstation, primary drawers, and secondary drawers can be altered as desired. Furthermore, in some cases housing 10 is defined by the structure within which the storage assembly is built, and is not necessarily a separate component from, from example, the seat casing 51 shown in FIGS. 7-9. Accordingly, the storage assembly 1 can be configured such that the workstation, and primary and secondary drawers are directly disposed within a structure of the vessel. However, a discrete housing 10 may be desired to provide additional stability, structure, and protection for the entire assembly. Further, in some cases the storage assembly 1 may be installed such that faceplate 11 is flush with its surrounding structure, or it faceplate 11 may provide a slightly elevate border as shown in the present figures. Consequently, the instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A storage assembly for a boat, comprising:
   a slideable upper drawer unit and a lower drawer unit contained within a housing disposed on said boat;
   said upper drawer unit;
   including a panel hingeably attached to a top surface of said upper drawer unit;
   wherein said panel is operable between a closed position and an open position;
   wherein, in said closed position, said panel is configured to cover and conceal at least a portion of said top surface of said upper drawer unit
   wherein in said open position, said panel is substantially perpendicular to said top surface of said upper drawer unit and said panel is slideably received in a vertically oriented slot at the rear of said upper drawer unit such that said panel at least partially extends above said top surface to delimit a backsplash for said upper drawer unit.

2. The storage assembly of claim 1, wherein said lower drawer unit comprises one or more drawers.

3. The storage assembly of claim 1, wherein said upper drawer unit includes a sink.

4. The storage assembly of claim 1, wherein said upper drawer unit includes a cook top.

5. The storage assembly of claim 1, wherein said housing is disposed within a seat casing of a seat on said boat.

6. The storage assembly of claim 1 further including one or more electro-mechanical stabilizers attached to a bottom surface of said upper drawer unit.

7. The storage assembly of claim 1, wherein said upper drawer unit is capable of being locked in either an open or a closed position by a cable retaining system, said system comprising a switch, one or more catches, and one or more cables connected between said switch and said catches, said switch operable to activate a protrusion of said one or more catches, said protrusion preventing movement of said upper drawer unit.

8. A boat, comprising:
   a console retaining a storage assembly;
   said storage assembly comprising a housing receiving a slideable upper drawer unit and a lower drawer unit;
   said upper drawer unit including a panel hingeably attached to a top surface of said upper drawer unit;
   wherein said panel is operable between a closed position and an open position;
   wherein, in said closed position, said panel is configured to cover and conceal at least a portion of said top surface of said upper drawer unit;
   wherein in said open position, said panel is substantially perpendicular to said top surface of said upper drawer unit and said panel is slideably received in a vertically oriented slot at the rear of said upper drawer unit such that said panel at least partially extends above said top surface to delimit a backsplash for said upper drawer unit.

9. The boat of claim 8, wherein said console comprises a seat casing.

* * * * *